Sept. 14, 1948. J. A. ROSMAIT 2,449,145
VALVE
Filed Aug. 28, 1944 2 Sheets-Sheet 2
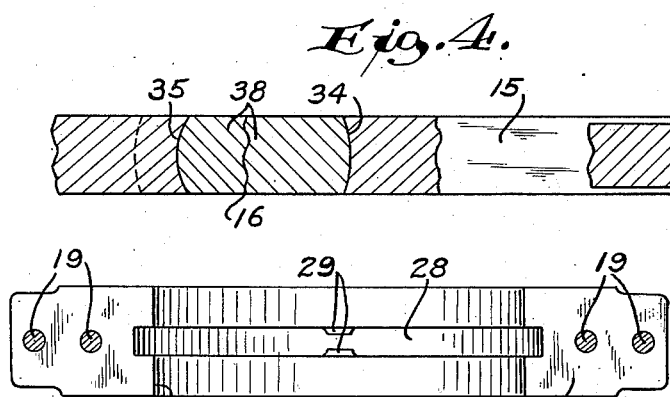
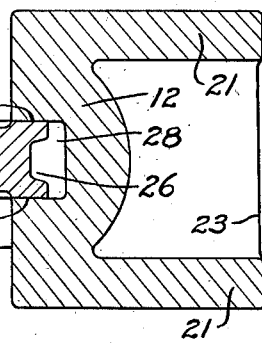
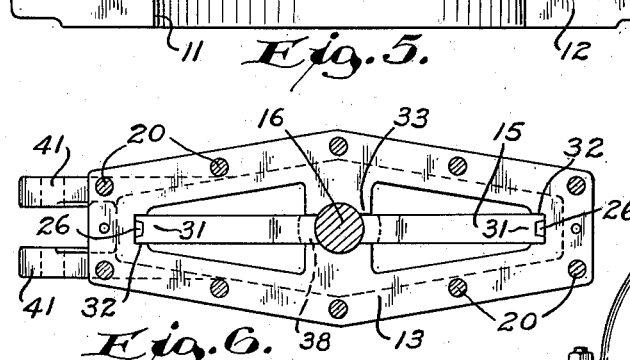
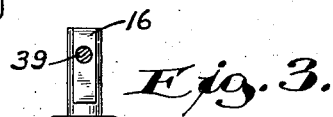
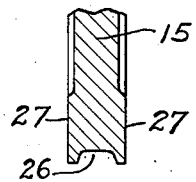
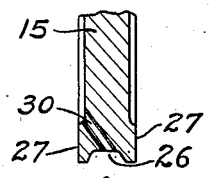
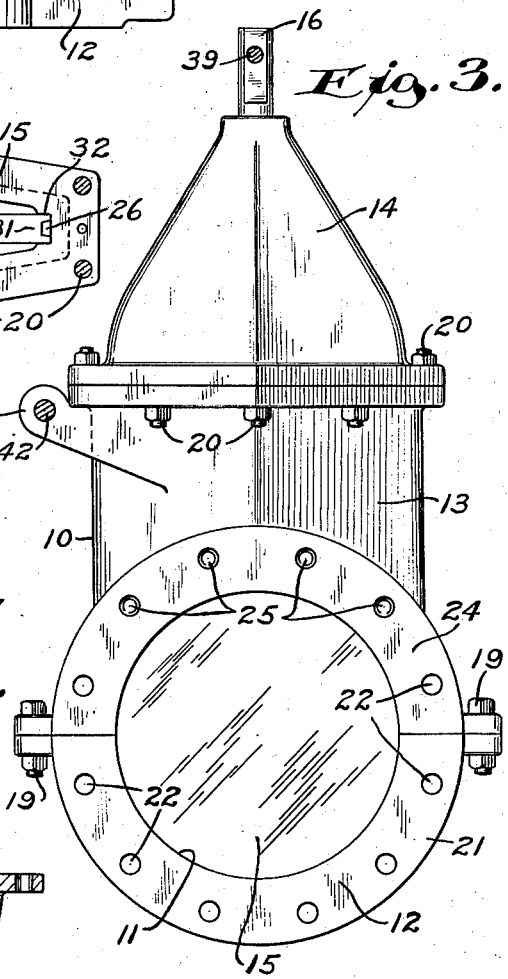
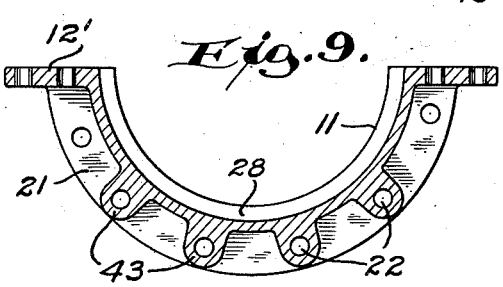
INVENTOR.
J. A. Rosmait
BY Lieber & Lieber
ATTORNEYS.

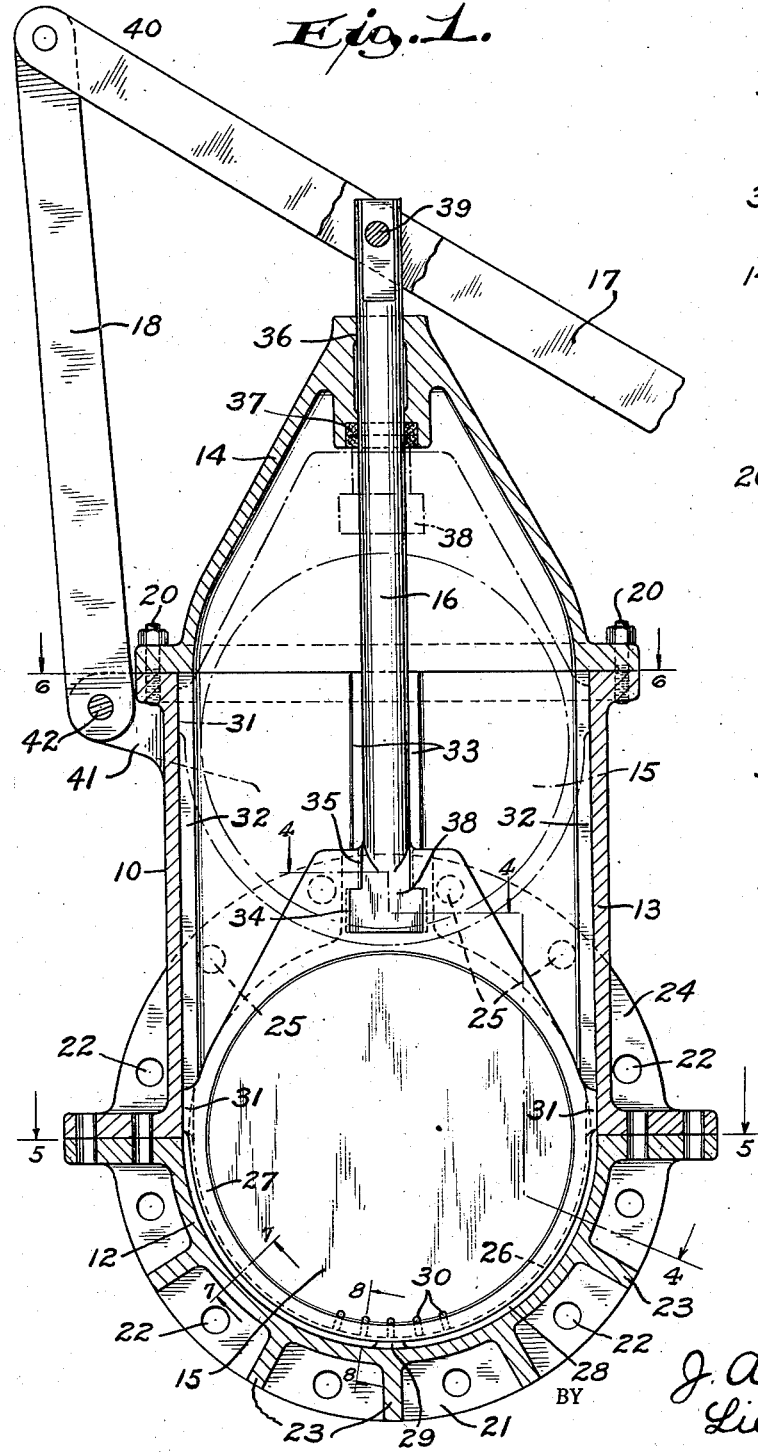

Patented Sept. 14, 1948

2,449,145

UNITED STATES PATENT OFFICE 2,449,145

VALVE

John A. Rosmait, Appleton, Wis., assignor to D. J. Murray Manufacturing Co., Wausau, Wis., a corporation of Wisconsin Application August 28, 1944, Serial No. 551,495

2 Claims. (Cl. 251—60)

The present invention relates in general to improvements in the art of liquid flow control, and relates more specifically to improvements in the construction and operation of valves for controlling the flow of liquids containing more or less solid matter in suspension.

The primary object of my invention is to provide an improved valve assemblage which is simple, compact and durable in construction, and which is also highly efficient in operation.

In certain industries, and especially in the paper manufacturing industry, there is frequent demand for a relatively large capactiy low pressure gate valve of the flanged type capable of controlling the flow of liquids such as fluent paper and pulp stock containing more or less solid matter in suspension. Such a valve is especially desirable for the purpose of sealing the suction side of an axial flow pulp stock pump associated with a reservoir filled with the fibre bearing stock, when it becomes necessary to work on the pump or the circulating system; and the available space for a valve in such a combination of elements is usually exceedingly limited. These valves besides being compact, must preferably be of light but durable construction, as well as being relatively inexpensive and readily operable; and they should also be adapted to thoroughly seal the passages in which they are located, in spite of the presence of considerable solid matter in the liquid. Great strength and lightness are also requisite in this type of valve because stresses and strains resulting from excessive weight and pressure, will cause deflections which result in valve and pump operating difficulties; and these valves should also be as simple as possible in order to insure continued satisfactory operation and low manufacturing cost. While many attempts have heretofore been made to produce a satisfactory gate valve adapted to meet these various requirements and conditions, none of these prior valves have proven entirely successful in accomplishing the desired results.

It is therefore an object of the present invention to provide an improved gate valve assemblage which in fact does meet all of the above mentioned requirements, and which may also be readily constructed, assemblied, and dismantled.

Some of the more specific objects and advantages of my present invention, are as follows:

To provide a light and durable gate valve of relatively large capacity, which is so compact that it may be installed within minimum space measured in the direction of flow, as well as in comparatively cramped quarters.

To provide an exceedingly strong but simplified gate valve assemblage which will effectively resist strains and stresses to which it may be subjected, and which is also easily manipulable at all times.

To provide a gate valve structure all parts of which may be readily constructed, assembled and dismantled, and which is operable to effectively control and to completely shut off the flow of liquids containing considerable solid matter in suspension.

To provide a valve assemblage which will not clog due to the presence of heavy fluids such as fibrous pulp, and which may be closed tightly in spite of the presence of considerable solid matter in the liquid.

To provide gate valve structure the various parts of which are of simplified construction and interchangeable with similar parts of like valve assemblages, and which may be expeditiously manufactured at moderate cost.

These and other specific objects and advantages will be apparent from the following detailed description.

A clear conception of the features constituting my present improvement, and of the mode of constructing and of operating gate valves embodying the invention, may be had by referring to the drawings accompanying and forming a part of this specification wherein like reference characters designate the same or similar parts in the various views.

Fig. 1 is a central vertical section through one of the improved gate valves, taken transversely of the direction of flow of liquid therethrough, and showing the valve disc closed in solid lines, and open in dot-and-dash lines;

Fig. 2 is a central vertical section through the same gate valve, taken longitudinally of the direction of liquid flow, the valve disc being closed;

Fig. 3 is an end view of the assembled gate valve looking in the direction of flow of liquid therethrough, the operating lever and linkage having been omitted;

Fig. 4 is an enlarged irregular transverse section through the upper portion of the valve disc, the lower portion of the actuating stem, and the lower semi-circular casing, the section having been taken along the line 4—4—4 of Fig. 1;

Fig. 5 is a transverse section through the gate valve assemblage taken between the lower and intermediate sections of the body, along the line 5—5 of Fig. 1;

Fig. 6 is another transverse section through the gate valve taken between the intermediate and upper body sections, along the line 6—6 of Fig. 1;

Fig. 7 is an enlarged fragmentary section through the periphery of the gate valve disc, taken along the radial line 7—7 of Fig. 1;

Fig. 8 is another similarly enlarged section through the periphery of the valve disc, taken along the radial line 8—8 of Fig. 1; and Fig. 9 is a section similar to that of Fig. 1, taken through a modified construction of the lower semi-circular casing or body section.

While the invention has been shown and described herein as having been embodied in a typical fibrous pulp flow control gate valve especially adapted for use in the paper making industry, it is not my desire or intent to unnecessarily restrict the scope or utility of the improved features, and it is to be understood that these valves may be furnished in various sizes and of diverse capacities.

Referring especially to Figs. 1 to 8 inclusive, the typical gate valve assemblage shown therein, comprises in general a hollow main body 10 having a circular through passage 11 therein for accommodating the flow of liquid, and consisting of a lower section or semi-circular casing 12, an intermediate section or valve disc guiding and receiving casing 13, and an upper section or cap casing 14; a flat valve plate or approximately circular disc 15 slidable within the body casings 12, 13, 14 from the solid line to the dot-and-dash line positions of Fig. 1 and vice versa; an elongated actuating stem 16 for the disc 15 penetrating the upper cap casing 14; and a manipulating lever 17 for the stem 16 coacting with the medial casing 13 through a connecting link 18.

The three body sections or casings 12, 13, 14 may be formed of durable metal castings, and the lower and intermediate casings 12, 13 are normally firmly but detachably connected by means of bolts 19, while the intermediate and upper sections 13, 14 are likewise detachably connected by means of studs 20 and nuts coacting therewith, as shown in Fig. 3. The lower semi-circular casing 12 bounds approximately one-half of the circular passage 11 and is provided with parallel laterally spaced and outwardly directed integral attaching flanges 21 each having a series of bolt holes 22 therein and which are firmly interconnected by integral ribs 23 radiating from the passage 11 and disposed between the successive holes 22. The intermediate guiding casing 13 which bounds the other half of the passage 11 is also provided with complementary semi-circular laterally spaced parallel integral end flanges 24 which merge with the adjacent casing walls and each of which is provided with two bolt holes 22 and with a series of threaded stud receiving sockets 25 at the zones of emergency into the walls. When the casings 12, 13 are united, the outer adjoining faces of the flanges 21, 24 lie in parallel planes which are spaced apart only sufficient distance to provide requisite strength and to accommodate the movable valve disc 15, thereby permitting insertion of the valve body 10 within spaces of minimum width.

The valve plate or disc 15 which is housed within the hollow body 10, may also be formed of durable metal in any suitable manner, and should be only of sufficient thickness to properly resist the pressures to which it may be subjected during normal use, in order to permit reduction of the distance between the opposite casing flanges 21, 24 to a minimum. The periphery of the major lower portion of the valve disc 15 is provided with a groove 26 as shown in Figs. 2, 4, 7 and 8, and has plane opposite faces 27 adapted to snugly engage the opposite sides of a semi-circular recess 28 formed in the lower casing 12 adjoining the passage 11, when the valve is closed. The lowermost portion of the casing recess 28 is provided with stop lugs 29 for preventing the disc 15 from seating on the bottom of the recess 28, and the lower part of the valve disc 15 has a series of ports 30 formed therein for connecting the interior of the recess 28 with the discharge end of the passage 11 whenever the gate valve is closed, as depicted in Figs. 1, 2, 4, 5 and 8. The medial opposite portions of the valve disc 15 are also provided with integral guiding projections 31 which are snugly but slidably cooperable with rectilinear parallel guiding grooves 32 formed within and extending throughout the length of the intermediate casing 13, and these guide grooves 32 are tangent to and are alined with the opposite ends of the semi-circular recess 28 of the lower casing 12 when the body 10 is assembled. The uppermost central portion of the valve disc 15 is slidably confined between spaced opposite guiding surfaces or ridges 33 of the intermediate casing 13, and is also provided with partially cylindrical concentric socket surfaces 34, 35 forming a stem attaching socket, see Figs. 1, 2, 4 and 6.

The upper body cap casing 14 which normally closes the upper ends of the disc guiding grooves 32 of the medial casing 13, is provided with a central bore 36 and a packing 37 with which the cylindrical valve actuating stem 16 is slidably cooperable, and the lower portion of this stem 16 is provided with a two-diameter flat head 38 adapted for snug confinement within the valve socket formed by the surfaces 34, 35. The actuating stem 16 also has sliding coaction with the intermediate casing 13 between the guide ridges 33 as indicated in Fig. 6, and the flat valve disc 15 may be rotated into operative position upon the stem head 38 and is most effectively guided during normal movement thereof, both by the guide grooves 32 and by the ridges 33 which also prevent the stem head 38 from becoming detached from the valve disc. By virtue of the re-enforced and sturdy construction of the body casings 12, 13, 14, this guiding of the valve disc 15 and actuating stem 16 is effected without subjecting the parts to undesirable stresses, and when the valve is open, the movable disc 15 is disposed entirely within the casings 13, 14 thus entirely avoiding obstruction to the flow of fluid through the passage 11.

While any suitable mechanism for reciprocating the actuating stem 16 so as to open and close the valve, may be utilized, I have found it desirable to provide the valve assemblage with an actuating lever 17 and a link 18 associated directly with the gate valve unit. The manipulating lever 17 may be pivotally attached to the upper outer end of the actuating stem 16 by means of a pivot bolt 39, and the end of this lever 17 may be connected to the upper extremity of the connecting link 18 by a fulcrum pin 40. The lower end of the swinging link 18 may be swingably attached to ears 41 formed integral with the medial casing 13, by means of a pivot pin 42; and the bolt 39 and pins 40, 42 may be readily applied and removed. With the aid of this manipulating mechanism, the valve disc 15 may obviously be moved in either direction at will, without subjecting the stem 16 to undesirable side thrust.

Although the construction of the lower casing 12 shown in Figs. 1, 2 and 4 is entirely satisfactory, it may be desirable in some cases to modify this casing structure as shown in Fig. 9. In this modification the semi-circular lower casing 12' is provided with external parallel flanges 21, bolt holes 22, and with an internal semi-circular recess 28 as in Figs. 1 and 3, but the radial ribs 23 have been replaced by radial bosses 43 surrounding some of the bolt holes 22 and integrally uniting the spaced parallel flanges 21. Both of the lower casings 12, 12' may be readily machined in complementary pairs, by fastening two of these semi-circular casings together after initially finishing the uppermost flat diametrical surfaces thereof, whereupon the two united casings may be finally machined simultaneously on a lathe or the like. The cap casing 14 may likewise be readily machined on a lathe or the like, and the lower and upper end surfaces of the medial casing 13 may be faced in a lathe while the rectilinear guide slots 32 may be dressed on a shaper or the like.

When the improved gate valve unit has been properly constructed and assembled as hereinabove described, the valve disc 15 may be raised and lowered with greatest ease, and the attaching flanges 21, 24 of the body 10 may obviously be inserted within extremely narrow limits of confinement. When the valve is closed, the space provided by the recess 28 will permit tight seating of the valve even if solid matter is deposited within this recess, and the grooves provided in the projections 31 as well as the ports 39, will permit escape of confined liquid and solid matter from within the groove 26. The opposite side surfaces 27 of the disc 15 will insure tight sealing, and these surfaces also cooperate with the guide grooves 32 and with the guide ridges 33 during opening of the valve. When the valve disc 15 has been elevated as illustrated in dot-and-dash lines in Fig. 1, the passage 11 is entirely free from obstruction, but the disc 15 may obviously be set so as to more or less close the passage 11. The stem 16 is obviously thoroughly guided and can be readily applied to or detached from the valve disc 15, and when the stem and disc have been assembled, the intermediate casing 13 will retain the parts in assembled condition. The manipulating lever 17 also serves to prevent possible rotation of the stem 16 after the valve disc and stem have been assembled, and the link 18 eliminates possible side thrust on the valve stem 16 during opening and closing movements.

The various features of improvement involved in the construction of the gate valve, are of extreme importance in reducing the cost thereof to a minimum, in making the valve suitable for various uses, and in prolonging the life of the valve assemblage. The construction of the body 10 and the internal parts which are normally housed within the body, so that the body may be disposed between adjacent members located closely adjacent to each other, is very important especially in connection with paper manufacturing installations. The reinforcing ribs 23 or bosses 43 cast integral with the flanges 21 and spaced about the clamping bolt holes 22, provide a rigid support for resisting compression of the body and resultant distortion and reduction of clearances. The formation of the guide grooves 32 for the valve disc 15, and the maintenance of desirable clearances, permits the valve disc 15 to slide freely in the grooves even after the valve assemblage has been clamped in final position. The construction of the valve body 10 of three coacting casings 12, 13, 14 and the splitting of the lower portion of the body on a diametral plane, facilitates machining of the parts and accurate formation of the grooves and recesses with which the valve disc 15 cooperates. The sectional formation of the body 10 also permits convenient machining of the stem guiding grooves and bores, in accurate alinement with the central plane of the valve disc 15, and the provision of the parallel guide ridges 33 in addition to the guide grooves 32, insures most effective guiding of the valve disc 15 during its opening and closing movements. The improved construction of the stem head 38 and the mode of attaching the same to the valve disc 15, also permits convenient assembling and dismantling of these parts and provides some flexibility in the connection between the stem and disc. The method of constructing the semi-circular lower casings 12, 12', also facilitates machining of these casings in pairs, and the lugs 29 prevent the valve disc 15 from seating in the bottom of the semi-circular recess 28. The relief ports 39 cooperate with the groove 26 in the valve disc 15 and with the recess 28 in the lower casing 12, so as to provide escape passages for the solid material and liquid during closing of the valve, and thereby positively prevent entrapment of solids and compression thereof beneath the valve disc when closing. These various features obviously cooperate to provide an extremely simple and durable valve assemblage which may be readily assembled or dismantled and which is highly effective in normal use.

From the foregoing detailed description it will be apparent that my present invention provides an improved gate valve assemblage which besides being simple, compact and durable in construction, is highly effective in operation and flexible in its adaptations, and which may also be installed in extremely confined quarters. The improved valve structure is thoroughly reinforced against possible deflection and is therefore easily operable at all times with minimum effort, and the valve can obviously be either fully opened or closed, or partially opened. All parts of the improved assemblage can obviously be quickly and accurately machined so as to permit manufacture of the improved valves at relatively moderate cost. While the improved valve assemblage is especially adapted for use in connection with fibrous pulp handling systems, it may obviously be utilized for many other purposes, and the improved valves may be manufactured in various sizes and capacities.

It should be understood that it is not desired to limit the present invention to the exact details of construction or to the precise mode of operation, herein shown and described, for various modifications within the scope of the appended claims may occur to persons skilled in the art.

I claim:

1. In a gate valve, a body having a through passage and parallel guiding grooves extending tangentially away from said passage, a flat valve disc having opposite guide projections slidably engaging said grooves and also having a T-shaped open sided socket therein between said guide projections, said valve disc being of approximately uniform thickness throughout its entire area, an actuating stem for said disc having a T-shaped head of like thickness snugly confined within and insertable through an open side of said socket and also having a portion beyond said head of greater thickness than said valve, and parallel guide ridges on said body coacting directly with said stem head and said valve disc to retain the head within said socket and also forming guide recesses coacting with the adjacent enlarged portion of said stem.

2. In a gate valve, a body having a through passage and parallel guiding grooves extending tangentially away from diametrically opposite portions of the passage, a flat valve disc of approximately uniform thickness throughout its entire area having integral opposite guide projections slidably engaging said grooves and also having a T-shaped open sided socket therein midway between said guiding grooves, an actuating stem for said disc having a flat T-shaped head of like thickness snugly confined within said socket and also having a major cylindrical portion of greater diameter than said thickness of the valve and head, and parallel guide ridges formed on said body parallel to said grooves and coacting directly with said stem head and said valve disc to retain the head within said socket, said ridges also forming guide recesses coacting with the adjacent enlarged portion of said stem.

JOHN A. ROSMAIT.

REFERENCES CITED

The following references are of record in the file of this patent:

UNITED STATES PATENTS

| Number | Name | Date |
|---|---|---|
| 207,365 | Morse | Aug. 27, 1878 |
| 534,360 | Collins | Feb. 19, 1895 |
| 594,634 | Lunken | Nov. 30, 1897 |
| 759,448 | Kiser | May 10, 1904 |
| 838,479 | Tromblee | Dec. 11, 1906 |
| 1,918,430 | Schlotmann | July 18, 1933 |
| 2,208,180 | Delleani | July 16, 1940 |

FOREIGN PATENTS

| Number | Country | Date |
|---|---|---|
| 144,531 | Germany | Sept. 21, 1903 |
| 752,036 | France | July 3, 1933 |